United States Patent [19]

Sacher et al.

[11] Patent Number: 4,526,711

[45] Date of Patent: Jul. 2, 1985

[54] HIGH REFRACTIVE INDEX FLUID AND MELT MOUNTING MEDIA

[75] Inventors: Robert L. Sacher; William J. Sacher, both of Newton, N.J.

[73] Assignee: R. P. Cargille Laboratories, Inc., Cedar Grove, N.J.

[21] Appl. No.: 530,537

[22] Filed: Sep. 9, 1983

[51] Int. Cl.³ .................. G02B 21/34; G01N 21/15
[52] U.S. Cl. .................................. 252/582; 252/1; 252/408.1; 350/312; 350/418; 568/580; 568/639; 585/428
[58] Field of Search .................. 252/1, 408.1, 582; 350/312, 418; 568/580, 639; 585/428; 526/346, 526/347.2; 524/371

[56] References Cited

U.S. PATENT DOCUMENTS

| | | | |
|---|---|---|---|
| 2,022,634 | 11/1935 | Britton et al. | 568/639 |
| 3,433,845 | 3/1969 | Kovach et al. | 585/428 |
| 3,437,402 | 4/1969 | Levins | 350/418 |
| 3,929,667 | 12/1975 | Bautis | 350/418 |
| 3,979,301 | 9/1976 | Ushioda et al. | 252/408.1 |

*Primary Examiner*—Paul Lieberman
*Assistant Examiner*—Robert A. Wax
*Attorney, Agent, or Firm*—Arthur L. Plevy

[57] ABSTRACT

Formulations for use as mounting media in microscopy and also useful as optical coupling materials for fibers and lens systems having a wide range of refractive index between 1.58 to 1.73 and exhibiting a range in viscosity from a very viscous fluid to a semi-solid resin or melt. The material is selected from brominated diphenyl oxides and modified or unmodified alpha-methylstyrene polymers. These materials can be employed individually or blended together with a stabilizer to provide a host of materials having different refractive indexes within said range and useful in various optical systems.

7 Claims, No Drawings

HIGH REFRACTIVE INDEX FLUID AND MELT MOUNTING MEDIA

BACKGROUND OF THE INVENTION

This invention relates to a refractive index fluid for optics and more particularly to such a fluid which can be employed as a coupling adhesive in the optical field.

The image of a specimen viewed through a microscope is very much effected by the refractive index and the optical dispersion (the change in refractive index with the wavelength of light) of the medium in which the specimen is mounted. For example, a colorless specimen will appear invisible unless it is a medium of a different refractive index from the specimen, and it will appear opaque and featureless if that difference in refractive index is too great. Also the identity of a specimen such as a mineral or glass can often be made by viewing it in a medium of a known but different optical dispersion and observing the resultant characteristic colors around the boundaries of the microscopic image.

Mounting media in microscopy are generally applied with the specimen to a glass slide and a thin glass cover slip is then applied so that the specimen is then sandwiched with the medium between the cover glass and the slide. For a "permanent slide" the medium is also an adhesive.

For example of such techniques reference is made to U.S. Pat. No. 3,445,152 entitled MICROSCOPE SLIDES AND METHOD OF MANUFACTURING issued on May 20, 1969 to S. B. Carter. This patent describes a particular type of slide using resins to affix the specimen.

Other patents as U.S. Pat. No. 3,736,042 entitled MICROSCOPE SLIDE ASSEMBLY issued on May 29, 1973 and shows other constructions and materials employed with such slides.

Other patents as U.S. Pat. No. 3,891,327 entitled MOUNTED SLIDES AND METHOD OF SECURING A COVER GLASS TO A GLASS SLIDE AND HAVING A SPECIMEN THEREON issued on June 14, 1975 to M. J. Welch. This patent shows a cover glass bonded to the glass slide in a fixed position by a photosensitive composition.

Most mounting media used by microscopists are essentially resins dissolved in a solvent. The main problems with solvent type media is, the very long time required to dry out the solvent to form a "permanent slide", change of refractive index as the medium dries, shrinkage and bubble formation upon drying, and cracking or crystallizing with drying or aging. The melt or fluid type media avoid these problems because the prepared slide does not change from the time it is made because there is no drying. The melt type medium is commonly heated until it is fluid on a hotplate along with the slide and specimen; the medium is applied over the specimen on the slide, the cover glass is affixed, and the slide is allowed to cool and form a "permanent slide" with the melt functioning as a resinous adhesive. Unlike the solvent type media, the slide can be reheated and the specimen removed if necessary. The fluid type medium can be used to make "semi-permanent slides". The specimen is sandwiched with a drop or two of the fluid medium between the cover slip and slide. This should not be confused with Cargille Refractive Index liquids which have a much lower viscosity. The fluid type medium has a very high viscosity for a liquid and the slide made using it is permanent with the cover slip secured well in place as long as the slides are stored in a flat rather than an upright position. The advantage of this type of medium is that while it secures the cover slip to protect the specimen during handling, the cover slip can be moved with a finger to rotate particles (such as diatoms and crystals) to change orientation for viewing. This rotation of the specimen by moving the coverslip with a finger is commonly done using Cargille Refractive Index liquids but such slides must be handled carefully because of the low viscosity of these liquids and are usually not considered "permanent or semi-permanent slides".

At one time the most common melt type medium was a material with the tradename Aroclor 5442. Aroclor 5442 was used for years and many reference substances used by microscopists were mounted in it, until the United States Environmental Protection Agency banned the substance because it might contain polychlorinated biphenyls (PCB's). The problem in finding a replacement for this material is that not only that high refractive index resins are scarce (Aroclor 5442 has a refractive index of 1.66) but the replacement must match the dispersion of it so that the vast sets of reference materials that microscopists have already mounted in Aroclor 5442 will be usable for comparison with materials mounted in the replacement material. Since the ban on Aroclor 5442 the only suitable high index mounting media have been Hyrax (refractive index 1.63) and Naphrax (refractive index 1.7) both of which are solvent based and hard to find.

U.S. Pat. No. 3,929,667 issued on Dec. 30, 1975 to A. N. Bautis and entitled IMMERSION OIL FORMULATIONS FOR USE IN MICROSCOPY AND SIMILAR FIELDS and assigned to the assignee herein. This patent describes a non-toxic immersion oil which was employed to replace oils containing PCBs.

In the field of optics there has long been a need for high refractive index adhesive material to join optical components. A relatively recent need is for a medium to reversibly join optical fibers that will have the necessary refractive index and optical properties to reduce a signal loss.

BRIEF DESCRIPTION OF THE PREFERRED EMBODIMENT

An optical coupling material for bonding one optical part to another, said material exhibiting a range in refractive index between 1.58 to 1.73 to enable the material to be employed in a wide range of optical applications, said material selected from a group consisting of a brominated diphenyloxide and an alpha-methylstyrene polymer.

DETAILED DESCRIPTION OF THE INVENTION

This invention which consists of blending brominated diphenyl oxides with alpha-methyl styrene of various types and proportions will fill the following needs:

1. Provide microscopists with a melt type medium that duplicates Aroclor 5442 both physically and optically but does not contain PCB's.
2. Provide microscopists high refractive index (1.58 to 1.73) fluid and melt type mounting media.
3. Provide the optical field with optical coupling media for fiber connectors, lens systems, etc.

The melt mounting media that will probably be the most used are blended from two end-members both melting at about 65° C. but representing the extremes of the refractive index range. The low end member (low refractive index end) consists of modified or unmodified alpha-methylstyrene such as by the trade name Kristalex made by Hercules of Wilmington, Del. The alpha-methylstyrene comes in grades of varying softening points which can be heated to 100°–120° blended together then filtered to produce a homogenous resin which is the low end member and the first example of this invention:

EXAMPLE 1

| MELT MOUNTING MEDIUM LOW END MEMBER | |
|---|---|
| Composition | blended modified alpha-methylstyrene |
| Refractive index at 25° C. | |
| nD (5893 A) | 1.581 |
| ne (5461 A) | 1.586 |
| Optical dispersion as Abbe Ve | 33 |
| Pour point | 60–70° C. |
| Density 25° C. (gm/cc) | 1.03 |

This medium has excellent glass to glass adhesion so that it makes good quality "permanent slides". The refractive index is close to that of Canada Balsam type solvent based mounting media which are currently the most or one of the most used mounting medium. Bacteriologists and others currently using Canada Balsam or one of the synthetic solvent based media (which all have similar refractive indicies) should find that specimens mounted in example 1 will have the same appearance.

Altering the alpha-methylstyrene polymer in example 1 to set a lower pour point will give the low end member of the most useful mounting medium and the next example of the invention:

EXAMPLE 2

| FLUID MOUNTING MEDIUM LOW END MEMBER | |
|---|---|
| Composition | blended modified alpha-methylstyrene |
| Refractive index at 25° C. | |
| nD (5893 A) | 1.557 |
| ne (5461 A) | 1.561 |
| Optical dispersion as Abbe Ve | 36 |
| Pour point | 23–28° C. |
| Density 25° C. (gm/cc) | 0.98 |

The medium is optically similar to example 1 but has a high viscosity fluid nature that will permit the movement of the cover slip and the reorientation of the specimen.

The melt mounting medium high end member is made from brominated diphenyl oxides. Employed was a blend of commercially available pentabromodiphenyl oxide which is a very viscous liquid (and the basis of the fluid mounting medium high end member) and octabromodiphenyl oxide which is a solid to produce a high index resin with pour point of about 65° C. To this was added 1 percent of a substituted 2-hydroxy benzophenone to improve stability. This mixture was heated to 100° C. blended then filtered and formed a high quality adhesive resin.

EXAMPLE 3

| MELT MOUNTING MEDIUM HIGH END MEMBER | |
|---|---|
| Composition: | 67% (by volume) pentabromodiphenyl oxide |
| | 32% (by volume) octabromodiphenyl oxide |
| | 1% (by volume) substituted 2-hydroxy benzophenone |
| Refractive index at 25° C. | |
| nD (5893 A) | 1.700 |
| ne (5461 A) | 1.707 |
| Optical dispersion as Abbe Ve | 24 |
| Pour point | 60–70° C. |
| Density 25°C. (gm/cc) | 2.41 |

This medium is excellent for making "permanent slides" of minerals, diatoms, and other specimens requiring high index media. It should also prove valuable as a coupling adhesive for use with lasers, fiber optics, and other fields in optics.

Elimination of the octabromodiphenyl oxide from example 3 will produce a very viscous liquid of high index that can be used as the high end member of the fluid mounting medium of example 4 of this invention:

EXAMPLE 4

| FLUID MOUNTING MEDIUM HIGH END MEMBER | |
|---|---|
| Composition: | 99% (by volume) pentabromodiphenyl oxide |
| | 1% (by volume) substituted 2-hydroxy benzophenone |
| Refractive index at 25° C. | |
| nD (5893 A) | 1.688 |
| ne (5461 A) | 1.695 |
| Optical dispersion as Abbe Ve | 25 |
| Pour point | 20–30° C. |
| Density 25° C. (gm/cc) | 2.25 |

This medium will be useful for the microscopic examination of diatoms, crystals and other materials requiring a high index medium where it is necessary to alter orientation of the material while under the cover slip. In addition the viscosity is high enough for use in optical coupling and especially in reversable fiber optic connections.

Refractive indicies between those of the end members will be of great interest but of particular interest will be a 1.662 refractive index melt mounting medium because it matches the optical characteristics and the pour point of Aroclor 5442 and this is example 5. It is made in the same fashion as the other examples by simple heating to 100° C., blending and filtering.

The list of ingredients for the AROCLOR substitute is given in the following example as compared with the properties of the AROCLOR 5442.

EXAMPLE 5

| A PCB FREE SUBSTITUTE FOR AROCLOR 5442 | | |
|---|---|---|
| | The Substitute | Aroclor 5442 |
| Composition: | 45% (by volume) pentabromodiphenyl oxide | chlorinated terphenyl and possibly chlorinated biphenyl (PCBs) |
| | 22% (by volume) octabromodiphenyl oxide | |
| | 32% (by volume) | |

A PCB FREE SUBSTITUTE FOR AROCLOR 5442

|  | The Substitute | Aroclor 5442 |
|---|---|---|
|  | blended modified alpha-methylstyrene 1% (by volume) substituted 2-hydroxy benzophenone |  |
| Refractive Index at 25° C. |  |  |
| nD (5893 A) | 1.662 | 1.662 |
| ne (5461 A) | 1.668 | 1.669 |
| Optical dispersion as Abbe Ve | 26 | 23 |
| Pour point | 60–70° C. | 60–70° C. |
| Density 25° C. (gm/cc) | 1.96 | 1.47 |

This substitute medium is easiler to handle than the Aroclor 5442 in that when it melts it is more fluid. Information on the toxicity of all the materials used in this invention is that they are all of relatively low toxicity.

We claim:

1. A liquid optical coupling material for bonding one optical part to another, said material exhibiting a range in refractive index between 1.58 to 1.73 to enable the material to be employed in a wide range of optical applications, said material being a blend consisting of a brominated diphenyloxide blended with an alpha-methylstyrene polymer, with said alpha-methylstyrene polymer selected to have an index of refraction of between 1.557 to 1.586 at 5893 Angstroms and having a density between 0.98 to 1.03 g/cc all at 25° C.

2. The optical coupling material according to claim 1, wherein said alpha-methylstyrene polymer has an index of refraction of 1.581 at 5893 Angstroms at a temperature of 25° C. and having a pour point between 60° C. to 70° C.

3. The optical coupling material according to claim 1, wherein said alpha-methylstyrene polymer has an index of refraction of 1.557 at 5893 Angstroms at a temperature of 25° C. with a pour point between 23° to 28° C.

4. The optical coupling material according to claim 1, wherein said brominated diphenyloxide is a pentabromodiphenyl oxide.

5. The optical coupling material according to claim 4 further including at least 1% by volume of a substituted 2-hydroxy benzophenone being 2-hydroxy-4-iso-octoxybenzophenone to impart a refractive index to the material of 1.688 at 25° C. with a pour point between 20°–30° C.

6. The optical coupling material according to claim 1, wherein said brominated diphenyloxide is a blend of 67% in volume of pentabromodiphenyloxide with 32% in volume of octabromodiphenyl oxide with the remainder being a stabilizer of 2-hydroxy-4-iso-octoxybenzophene to provide an optical coupling material having a refractive index at 25° of 1.700 at 5893 Angstroms with a pour point between 60° to 70° C.

7. A liquid optical coupling material for bonding one optical part to another, said material consisting essentially of a blend by volume of 45% pentabromodiphenyl oxide, 22% of octabromodiphenyl oxide, and 32% of an alpha-methylstyrene polymer and polymer selected to have an index of refraction of between 1.557 to 1.586 at 5893 Angstroms and having a density of between 0.98 to 1.03 g/cc at 25°, and of a 1% stabilizer being 2-hydroxy-4-iso-octoxybenzophenone to give a refractive index at 25° C. of 1.662 at 5893 Angstroms, with a pour point between 60° to 70° C.

* * * * *